(12) United States Patent
Emberty et al.

(10) Patent No.: US 6,657,968 B1
(45) Date of Patent: Dec. 2, 2003

(54) GLITCHER SYSTEM AND METHOD FOR INTERFACED OR LINKED ARCHITECTURES

(75) Inventors: Robert George Emberty, Tucson, AZ (US); Craig Anthony Klein, Tucson, AZ (US); Gregory Allen Williams, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/314,175

(22) Filed: May 18, 1999

(51) Int. Cl.[7] .................................................. H04J 3/14
(52) U.S. Cl. ..................................... 370/242; 370/244
(58) Field of Search ............................... 370/242–245, 370/400, 216, 246; 709/224; 714/33

(56) References Cited

U.S. PATENT DOCUMENTS

| | | | |
|---|---|---|---|
| 3,715,573 A | * 2/1973 | Vogelsberg | 714/33 |
| 3,909,563 A | * 9/1975 | Ghosh et al. | 370/246 |
| 4,211,920 A | 7/1980 | Wakabayashi | |
| 5,271,000 A | * 12/1993 | Engbersen et al. | 370/244 |
| 5,353,147 A | 10/1994 | Grimes | |
| 5,633,709 A | 5/1997 | Ohtaki et al. | |
| 5,686,986 A | 11/1997 | Li et al. | |
| 5,812,529 A | * 9/1998 | Czarnik et al. | 370/245 |
| 5,881,237 A | * 3/1999 | Schwaller et al. | 709/224 |
| 6,487,208 B1 | * 11/2002 | Chirashnya et al. | 370/400 |

* cited by examiner

*Primary Examiner*—Salvatore Cangialosi
(74) *Attorney, Agent, or Firm*—Dale M. Crockatt; Bracewell & Patterson, L.L.P.

(57) ABSTRACT

A serial differential link glitcher system and method which allow for verification of error recovery by an interfaced or linked architecture system. The system and method provide accurate, reliable, and more assured fault simulation, such as noisy interface and dirty link simulations, within an interfaced or linked architecture system for verification of such error recovery and verifies and checks data at a lower level between interfaced devices. The system and method verify disparity errors between interfaced devices and also perform verification of error recovery between electrically linked devices or optically linked devices. At least two devices are coupled together by communication lines. Normal mode allows for normal operation of and normal communication between the at least two devices, and glitch mode provides fault simulation and disparity errors and phase inversion between the at least two devices for testing error recovery of the system. Proper polarity of the communication lines is maintained between the at least two devices when the system is in normal operation mode. The polarity of the communication lines between the at least two devices is switched and inverted when the system is in glitch mode wherein phase inversion and disparity errors in the communication lines are created. The glitcher switch system comprises a switch and a control circuit. The switch allows switching between the communication mode, that is, between the normal operation mode and the glitch mode. The control circuit controls the switch in placing the system in the normal operation mode or the glitch mode.

22 Claims, 4 Drawing Sheets

GLITCHER SYSTEM AND METHOD FOR INTERFACED OR LINKED ARCHITECTURES

BACKGROUND OF THE INVENTION

1. Technical Field

The present invention relates in general to a glitcher for interfaced or linked systems and in particular to an interfaced or link glitcher system and method that creates faults and simulates noisy interfaces to verify error recovery in various interfaced or linked architectures.

2. Description of the Related Art

Various types of interfaced or linked architectures exist wherein various computer systems and/or devices are coupled together in communication with each other by these various types of interfaced or linked architectures. Two main types of interfaced or linked architectures are a serial differential interfaced system and an optical interfaced system. Examples of such interfaced or linked architectures include but are not limited to serial storage architecture (SSA) (serial differential interface type), fibre channel (optical type), IEEE 1394 interface architecture, ethernet, USB, and ATM.

As an example, a serial storage architecture (SSA) system typically has a SSA initiator serially linked to and in communication with a number of target disk drives. Interfaces exist between each of the devices in the SSA system. Ensuring that the SSA system is able to properly perform error recovery in the event of a faulty link or interface between devices of the SSA system is very important.

However, simulation of a noisy interface or dirty link between interfaced or linked devices that are coupled together by an interfaced or linked architecture has been extremely difficult, especially at high speeds, in order to verify and test the error recovery performance of the interfaced or linked architecture system. A good standard conventional system or method for verifying and testing the error recovery in an interfaced or linked architecture system has not been developed and generally does not exist. Several less conventional systems and methods in verifying and testing the error recovery of such interfaces have been used or employed.

Such less conventional systems and methods have included the unplugging of links between devices or the using of faulty cables between devices to create or simulate noisy interfaces and dirty links in order to perform the error recovery testing. However, the results of unplugging a link or using a faulty or bad cable between devices is very unpredictable. Typically, the unplugging of a link or the using of a faulty or bad cable between the devices may result in either the device(s) being entirely or completely shut down or killed wherein fault simulation and error recovery testing cannot be continued or may result in no errors being generated wherein accurate fault simulation and error recovery testing cannot be achieved.

Also systems and methods for verifying whether data has been transferred between devices exist. Such systems and methods verify and check for Cyclic Redundancy Checker (CRC) errors. These systems and methods verify whether any of the bits of information within a frame has changed. Therefore, systems and methods for checking CRC errors exist, but good standard conventional systems or methods for verifying and checking data at a lower level such as verifying disparity errors (i.e. every word of data is checked whether control word, etc.) and verifying recovery from such errors generally does not exist.

It would be advantageous and desirable to provide a system and method that allows for verification of error recovery by an interfaced or linked architecture system. It would further be advantageous and desirable to provide accurate, reliable, and more assured fault simulation, such as noisy interface and dirty link simulations, within an interfaced or linked architecture system for verification of such error recovery. It would also be advantageous and desirable to have a system and method for verifying and checking data at a lower level. It would therefore be advantageous and desirable to provide a system and method for verifying recovery of disparity errors.

SUMMARY OF THE INVENTION

It is therefore one object of the present invention to provide a system and method that allows for verification of error recovery by an interfaced or linked architecture system.

It is another object of the present invention to provide accurate, reliable, and more assured fault simulation, such as noisy interface and dirty link simulations, within an interfaced or linked architecture system for verification of such error recovery.

It is a further object of the present invention to have a system and method for verifying and checking data at a lower level between interfaced devices.

It is still a further object of the present invention to provide a system and method for verifying disparity errors between interfaced devices.

It is another object of the present invention to be able to perform verification of error recovery between electrically linked devices or optically linked devices.

The foregoing objects are achieved as is now described. A serial differential link glitcher system and method which allow for verification of error recovery by an interfaced or linked architecture system. The system and method provide accurate, reliable, and more assured fault simulation, such as noisy interface and dirty link simulations, within an interfaced or linked architecture system for verification of such error recovery and verifies and checks data at a lower level between interfaced devices. The system and method verify disparity errors between interfaced devices and also perform verification of error recovery between electrically linked devices or optically linked devices. At least two devices are coupled together by communication lines. Normal mode allows for normal operation of and normal communication between the at least two devices, and glitch mode provides fault simulation and disparity errors and phase inversion between the at least two devices for testing error recovery of the system. Proper polarity of the communication lines is maintained between the at least two devices when the system is in normal operation mode. The polarity of the communication lines between the at least two devices is switched and inverted when the system is in glitch mode wherein phase inversion and disparity errors in the communication lines are created. The glitcher switch system comprises a switch and a control circuit. The switch allows switching between the communication mode, that is, between the normal operation mode and the glitch mode. The control circuit controls the switch in placing the system in the normal operation mode or the glitch mode.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF ILLUSTRATIVE EMBODIMENT

The present invention is a glitcher system 10 and method for interfaced or linked architectures. Interfaced or linked architectures generally include two main types: a serial differential interfaced system and an optical interfaced system. Examples of such interfaced or linked architectures include but are not limited to serial storage architecture (SSA) (serial differential interface type), fibre channel (optical type), IEEE 1394 interface architecture, ethernet, USB, and ATM. The present invention glitcher system 10 and method are not in any way limited to being used in the specific interfaced or linked architectures disclosed hereafter, and the present invention may be used or adapted to be used in any type of suitable interfaced or linked architecture.

The system 10 and method allow for verification of error recovery by an interfaced or linked architecture, such as a serial differential interfaced system or an optical interfaced system. The system 10 and method provide accurate, reliable, and more assured fault simulation, such as noisy interface and dirty link simulations, within an interfaced or linked architecture system for verification of such error recovery and verifies and checks data at a lower level between interfaced devices. The system 10 and method verify disparity errors between interfaced devices and also perform verification of error recovery between electrically linked devices or optically linked devices or any other suitable types of interfaced or linked devices.

Figure 1:
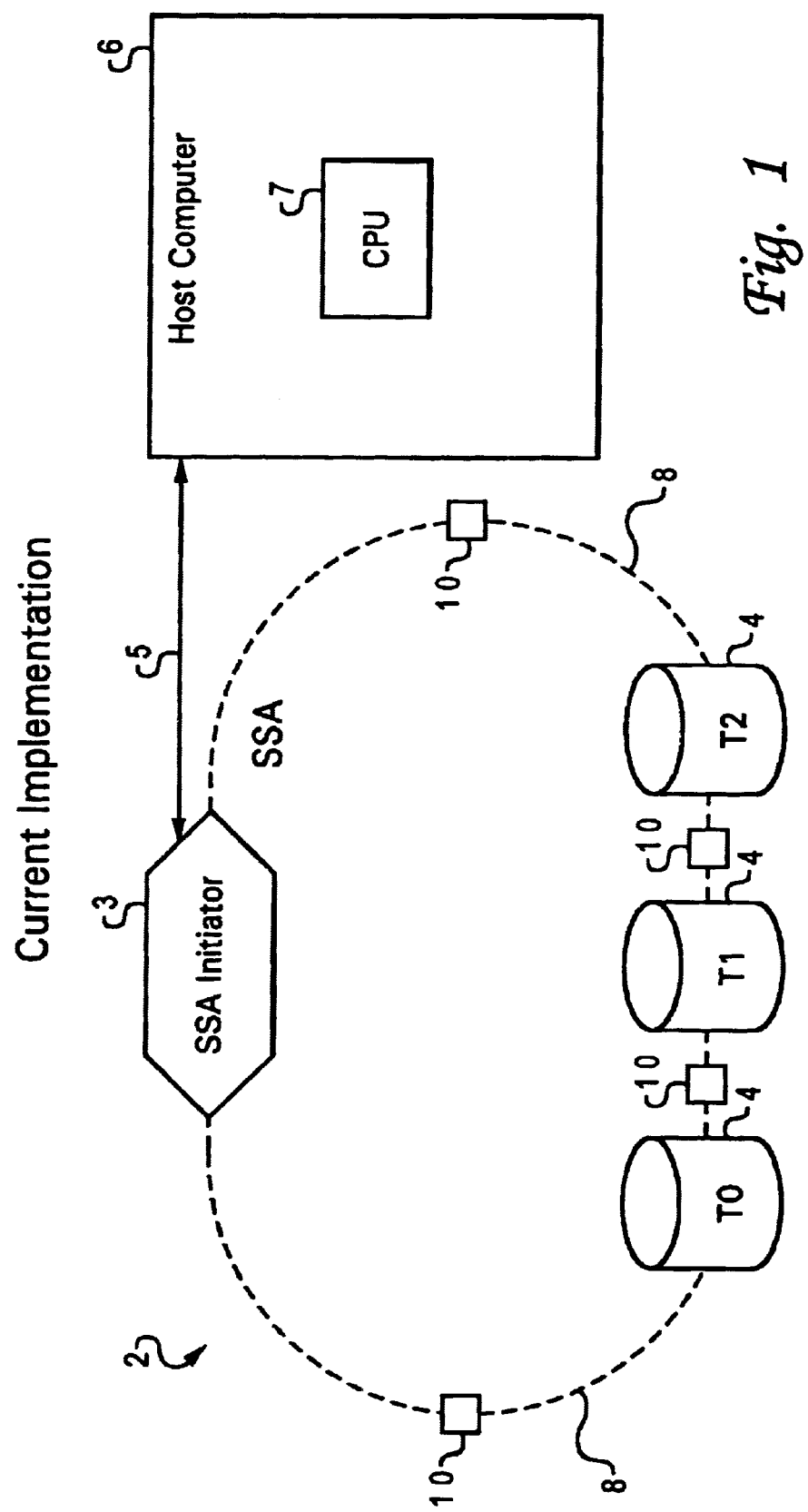
FIG. 1 is a block diagram of an overall interfaced or linked architecture system, such as a Serial Storage Architecture (SSA) system, wherein the present invention link glitchers for interfaced or linked architectures are coupled between the interfaced or linked devices.

With reference now to the figures and in particular with reference to FIG. 1, an overall interfaced or linked architecture system, such as a Serial Storage Architecture (SSA) system 2, is shown. In this specific example shown in FIG. 1, serial differential link glitchers 10 are coupled between any devices of the SSA system 2. Glitchers 10 are coupled between the target disk drives 4 and also between a target disk drive 4 and the SSA initiator 3. The SSA system 2 is shown coupled via communication link 5 to a host computer 6 with a central processing unit (CPU) 7. The present invention glitchers 10 are able to couple electrically linked devices, such as devices having copper links, or they may also couple optically linked devices, such as fiber communication or interfaced devices. The present invention glitchers 10 are not in any way limited to being used with particular types of links or interfaces described in this specification, and the glitchers 10 may be used with any suitable links or interfaces.

Figure 2:
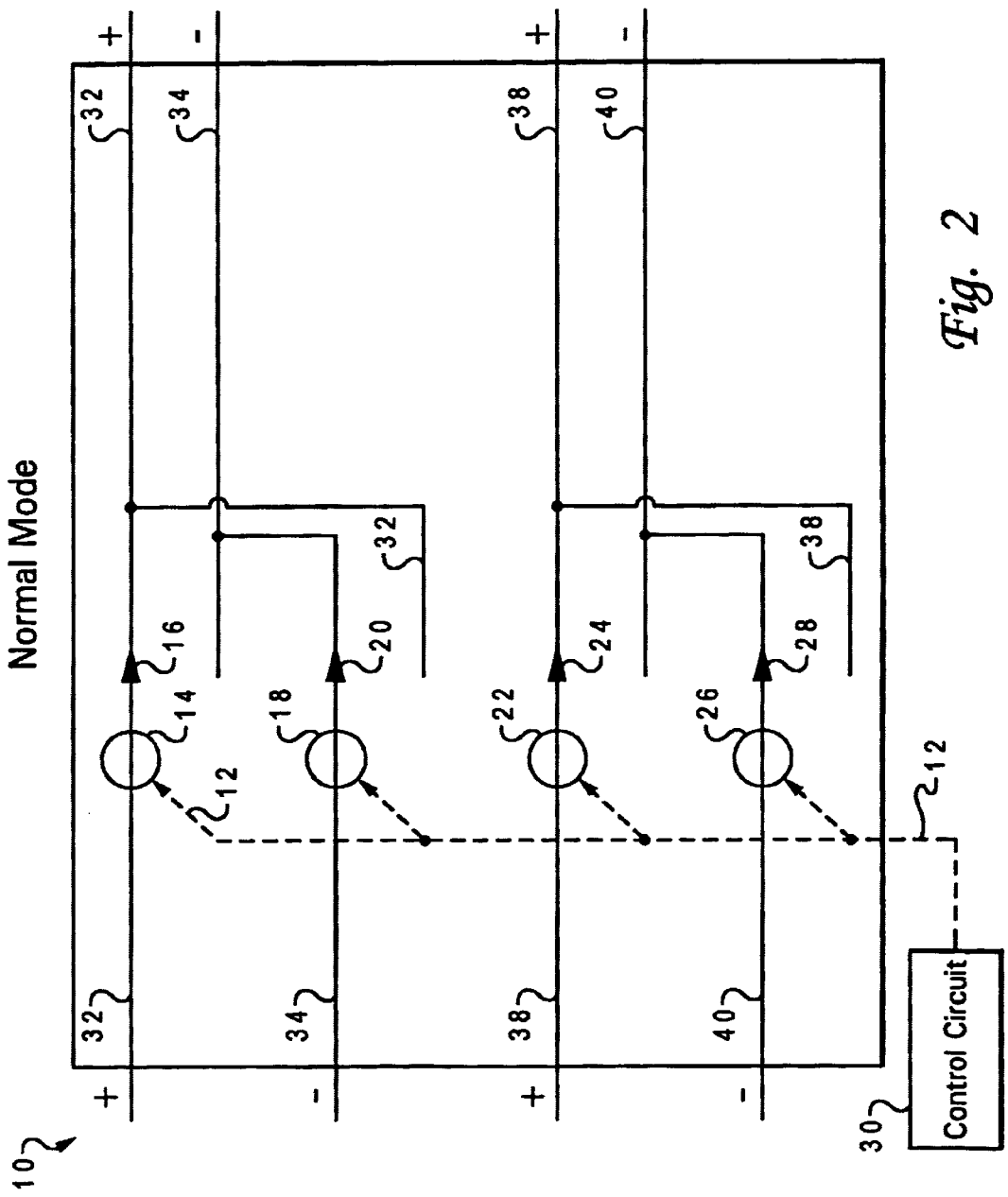
FIG. 2 is an overall schematic diagram of the present invention link glitcher for interfaced or linked architectures, such as for a serial differential interface system, wherein the glitcher is set in a normal mode.
Figure 3:
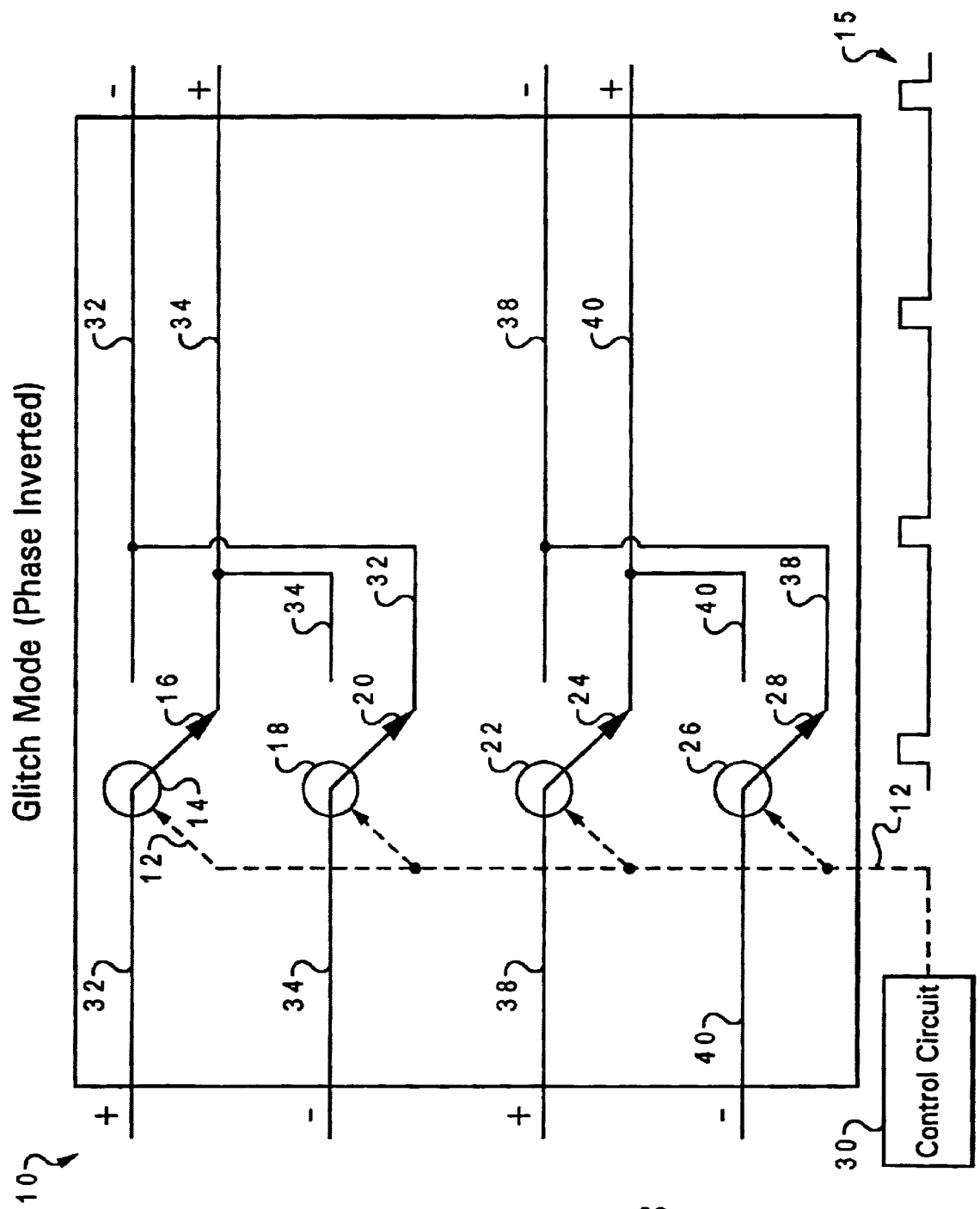
FIG. 3 is an overall schematic diagram of the present invention link glitcher for interfaced or linked architectures, such as for a serial differential interface system, wherein the glitcher is set in a phase inverted mode.

With reference now to FIGS. 2 and 3, the overall serial differential link glitcher 10 is shown in more detail. The glitcher 10 has a quad-pole, double throw switch 12. The switch 12 has four switch devices 14, 18, 22, and 26 with respective switch components 16, 20, 24, and 28. The switch devices 14 and 18 are switchingly coupled to one set of communication lines 32 and 34 while the switch devices 22 and 26 are switchingly coupled to another set of communication lines 38 and 40. The one set of communication lines 32 and 34 provide one direction of communication from one interfaced or linked device to another interfaced or linked device, such as a target disk drive 3 or a SSA initiator 4 or other such SSA device, while another set of communication lines 38 and 40 provide an opposite direction of communication from the other interfaced or linked device to the one interfaced or linked devices. The communication lines 32 and 38 are positive communication lines for each respective set while the communication lines 34 and 40 are negative communication lines for each respective set. A control circuit 30 is coupled to the switch 12 for controlling and switching the glitcher 10 between a normal mode and a glitch or phase inverted mode. The control circuit 30 creates a series of pulses for controlling the mode of the glitcher 10. The control circuit 30 includes a single shot monostable multivibrator and a standard 555 timer. Control circuit 30 provides the timing of the inversion of the communication lines (FIG. 3 shows a timing diagram 15). The one shot monostable multivibrator controls the widths of the pulses, that is, the lengths of times that two communication lines are inverted or flipped. The standard 555 timer sets the duration between two pulses, that is, the time between when inversions of communication lines occur.

As shown in FIG. 2, the glitcher 10 is set in the normal mode of operation wherein the communication link and interface between the interfaced or linked devices are operated in the normal and conventional manner. In the normal mode, fault simulation is not being performed, and error recovery checking of the interfaced or linked architecture system, such as the SSA system 2, is not being executed. FIG. 2 shows that the switch component 16 of the switch device 14 is positioned to maintain the link and positive polarity along communication line 32 from one interfaced or linked device to another interfaced or linked device and that the switch component 20 of the switch device 18 is positioned to maintain the link and negative polarity along communication line 34 from one interfaced or linked device to another interfaced or linked device to keep this one set of communication lines in the normal mode. FIG. 2 also shows that the switch component 24 of the switch device 22 is positioned to maintain the link and positive polarity along communication line 38 from the other interfaced or linked device to the one interfaced or linked device and that the switch component 28 of the switch device 26 is positioned to maintain the link and negative polarity along communication line 40 from the other interfaced or linked device to the one interfaced or linked device to keep this other set of communication lines in the normal mode. Thus, proper polarity is maintained along the communication lines, and communication signals between the interfaced or linked devices operate and transmit in the normal and conventional manner when the glitcher 10 is set in the normal mode.

As shown in FIG. 3, the glitcher 10 is set in the glitch or phase inverted mode of operation wherein the communication link and interface between the inter-faced or linked devices are operated in a glitch or phase inverted manner. In the glitch or phase inverted mode, fault simulation is being performed, and error recovery checking of the interfaced or linked architecture system, such as the SSA system 2, is being executed. FIG. 3 shows that the switch component 16 of the switch device 14 is switched to couple the communication line 32 from the one interfaced or linked device with the communication line 34 of another interfaced or linked device while the switch component 20 of the switch device 18 is switched to couple the communication line 34 from the one interfaced or linked device to the communication line 32 of the other interfaced or linked device. For the one set of communication lines 32 and 34, the polarity of the communication line 32 to the other interfaced or linked device switches from positive to negative creating a phase inversion and a disparity error for communication line 32 while the polarity of the communication line 34 to the other interfaced or linked device switches from negative to positive creating a phase inversion and a disparity error for communication line 34. Similarly, FIG. 3 shows that the switch component 24 of the switch device 22 is switched to couple the communication line 38 from the other interfaced or linked device with the communication line 40 to the one interfaced or linked device while the switch component 28 of the switch device 26 is switched to couple the communication line 40 from the other interfaced or linked device to the communication line 38 of the one interfaced or linked device. For the other set of communication lines 38 and 40, the polarity of the communication line 38 to the one interfaced or linked device switches from positive to negative creating a phase inversion and a disparity error for communication line 38 while the polarity of the communication line 40 to the one interfaced or linked device switches from negative to positive creating a phase inversion and a disparity error for communication line 40. Thus, disparity errors are created between the interfaced or linked devices since the logical value of the communication lines have been inverted between the SSA devices, and the data has been changed and corrupted with a phase inversion or polarity disparity. Communication signals between the interfaced or linked devices operate and transmit in a glitch or phase inversion when the glitcher 10 is set in the glitch or phase inversion mode.

Figure 4:
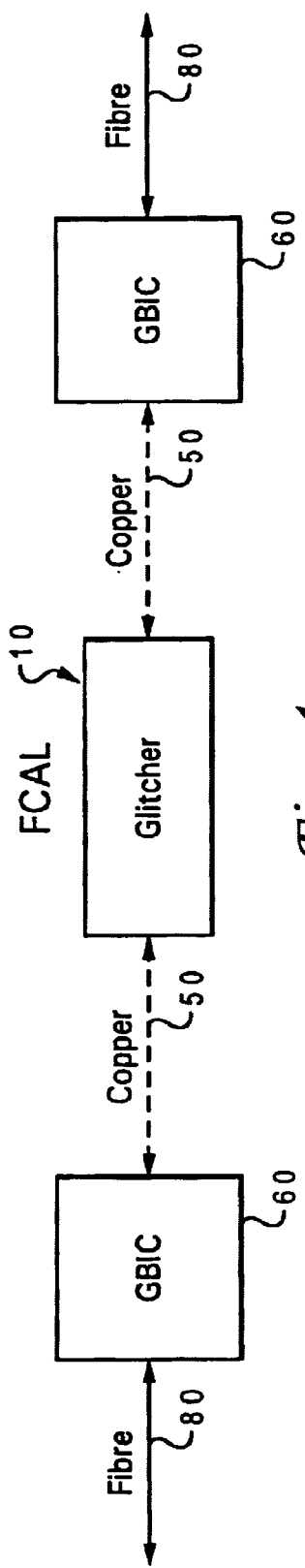
FIG. 4 shows a block diagram of one embodiment configuration in which the present invention glitcher of FIGS. 2 and 3 is adapted to be used with optical interfaced devices, such as fibre channel interfaced devices.
Figure 5:
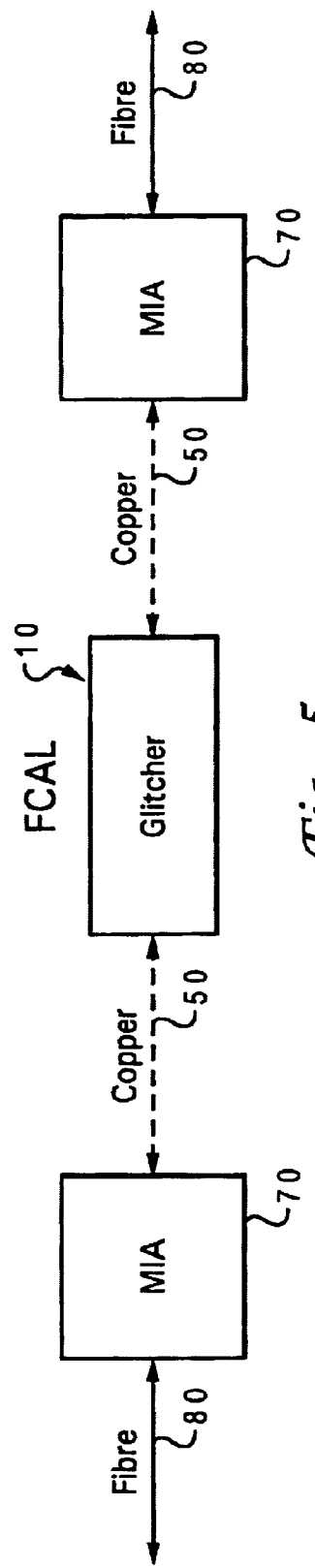
FIG. 5 shows a block diagram of another embodiment configuration in which the present invention glitcher of FIGS. 2 and 3 is adapted to be used with optical interfaced devices, fiber channel interfaced devices.

The glitcher 10 couples and provides glitches and phase inversion to electrically interfaced devices such as serial differential interfaced devices or SSA devices via copper wiring or links to the two directions of communications provided by communication lines. However, the same glitcher 10 may be adapted to couple and be used for glitching and phase inverting optical interfaced devices or fibre communication devices. FIGS. 4 and 5 show example configurations as to how the present invention glitcher 10 of FIGS. 2 and 3 is adapted to be used and coupled to the communication lines of optical interfaced devices or fibre communication devices. FIGS. 4 and 5 show that the glitcher 10 has its electrical or copper wiring/links 50 for both directions of communication coupled thereto. A gigabit interface converter (GBIC) 60 as shown in FIG. 4 or a media interface adapter (MIA) 70 as shown in FIG. 5 is coupled to the copper wiring/link 50 for each direction of communication to convert electrical interface to fibre channel communication or fibre channel interface. Each GBIC 60 or MIA 70 couples to optical or fibre channel interface wiring or links, which, in turn, are coupled to the optical or fibre channel communication devices. The glitcher 10 is used in the same manner as described above, and the GBIC 60 or MIA 70 provides conversion that allows the glitcher 10 to be used with optical or fibre channel communication devices.

While the invention has been particularly shown and described with reference to a preferred embodiment, it will be understood by those skilled in the art that various changes in form and detail may be made therein without departing from the spirit and scope of the invention.

What is claimed is:

1. A method of switching between a normal operation mode and a glitch mode of a system having at least two devices coupled together by communication lines wherein the normal mode allows for normal operation of and normal communication between the at least two devices and the glitch mode provides fault simulation and disparity errors and phase inversion between the at least two devices for testing error recovery of the system comprising the steps of:

maintaining proper polarity of the communication lines between the at least two devices when the system is in the normal operation mode, and switching and inverting polarity of the communication lines between the at least two devices when the system is in the glitch mode.

2. The method according to claim 1 further comprising the step of:

providing a switch and a control circuit coupled to the communication lines for controlling and switching the system between the normal operation mode and the glitch mode.

3. The method according to claim 1 wherein the communication lines further comprises:

a positive transmit communication line from one of the at least two devices coupled to a positive receive communication line to another of the at least two devices and a negative transmit communication line from the one of the at least two devices coupled to a negative receive communication line to another of the at least two devices to provide the normal communication when the system is in the normal mode, and the positive transmit communication line from the one of the at least two devices is coupled to the negative receive communication line to the another of the at least two devices and the negative transmit communication line from the one of the at least two devices is coupled to the positive receive communication line to the another of the at least two devices to provide the fault simulation and the disparity errors and the phase inversion when the system is in the glitch mode.

4. The method according to claim 3 wherein the communication lines further comprises:

a positive transmit communication line from the another of the at least two devices coupled to a positive receive communication line to the one of the at least two devices and a negative transmit communication line from the another of the at least two devices coupled to a negative receive communication line to the one of the at least two devices to provide the normal communication when the system is in the normal mode, and the positive transmit communication line from the another of the at least two devices is coupled to the negative receive communication line to the one of the at least two devices and the negative transmit communication line from the another of the at least two devices is coupled to the positive receive communication line to the one of the at least two devices to provide the fault simulation and the disparity errors and the phase inversion when the system is in the glitch mode.

5. The method of claim 4, wherein the devices are disk drives in a serial storage architecture (SSA) system.

6. The method according to claim 4 further comprising the step of:

providing a switch and a control circuit coupled to the communication lines for controlling and switching the system between the normal operation mode and the glitch mode.

7. The method according to claim 6 wherein the providing step further comprises the step of:

providing a quad-pole, double throw switch having four switch devices with four respective switch components.

8. The method according to claim 7 wherein the step of providing a quad-pole, double throw switch further comprises the steps of:

using a first one of the four switch devices to switchingly couple the positive transmit communication line from the one of the at least two devices to the positive receive communication line to the another of the at least two devices when the system is in the normal operation mode and to switchingly couple the positive transmit communication line from the one of the at least two devices to the negative receive communication line to the another of the at least two devices when the system is in the glitch mode, using a second one of the four switch devices to switchingly couple the negative transmit communication line from the one of the at least two devices to the negative receive communication line to the another of the at least two devices when the system is in the normal operation mode and to switchingly couple the negative transmit communication line from the one of the at least two devices to the positive receive communication line to the another of the at least two devices when the system is in the glitch mode, using a third one of the four switch devices to switchingly couple the positive transmit communication line from the another of the at least two devices to the positive receive communication line to the one of the at least two devices when the system is in the normal operation mode and to switchingly couple the positive transmit communication line from the another of the at least two devices to the negative receive communication line to the one of the at least two devices when the system is in the glitch mode, and using a fourth one of the four switch devices to switchingly couple the negative transmit communication line from the another of the at least two devices to the negative receive communication line to the one of the at least two devices when the system is in the normal operation mode and to switchingly couple the negative transmit communication line from the another of the at least two devices to the positive receive communication line to the one of the at least two devices when the system is in the glitch mode.

9. The method according to claim 6 wherein the providing step further comprises the step of:

providing a timer and an one shot monostable multivibrator for the control circuit in controlling and switching the system between the normal operation mode and the glitch mode.

10. A glitcher switch system that switches communication mode between a normal operation mode and a glitch mode, wherein the glitcher switch system is able to couple together at least two devices wherein the normal mode allows for normal operation of and normal communication between the at least two devices, and the glitch mode provides fault simulation and disparity errors and phase inversion between the at least two devices for testing error recovery of the system comprising:

a switch for coupling to the communication lines and for maintaining proper polarity of the communication lines between the at least two devices when the system is in the normal operation mode, and for switching and inverting polarity of the communication lines between the at least two devices when the system is in the glitch mode, and a control circuit coupled to the switch for controlling the switch in setting the communication mode between the normal operation mode and the glitch mode.

11. The glitcher switch system according to claim 10 further comprises:

communication lines coupled to the switch, and at least two devices coupled to the communication lines.

12. The glitcher switch system according to claim 11 wherein the communication lines further comprises:

a positive transmit communication line from one of the at lest two devices coupled to a positive receive communication line to another of the at least two devices and a negative transmit communication line from the one of the at least two devices coupled to a negative receive communication line to another of the at least two devices to provide the normal communication when the system is in the normal mode, and the positive transmit communication line from the one of the at least two devices is coupled to the negative receive communication line to the another of the at least two devices and the negative transit communication line from the one of the at least two devices is coupled to the positive receive communication line to the another of the at least two devices to provide the fault simulation and the disparity errors and the phase inversion when the system is in the glitch mode.

13. The glitcher switch system according to claim 12 wherein the communication lines further comprises:

a positive transmit communication line from the another of the at least two devices coupled to a positive receive communication line to the one of the at least two devices and a negative transmit communication line from the another of the at least two devices coupled to a negative receive communication line to the one of the at least two devices to provide the normal communication when the system is in the normal mode, and the positive transmit communication line from the another of the at least two devices is coupled to the negative receive communication line to the one of the at least two devices and the negative transmit communication line from the another of the at least two devices is coupled to the positive receive communication line to the one of the at least two devices to provide the fault simulation and the disparity errors and the phase inversion when the system is in the glitch mode.

14. The glitcher switch system of claim 13, wherein the devices are disk drives in a serial storage architecture (SSA) system.

15. The glitcher switch system according to claim 10 wherein the switch is a quad pole, pole, double throw switch having four switch devices with four respective switch components.

16. The glitcher switch system according to claim 15 wherein:
   a first one of the four switch devices is used to switchingly couple the positive transmit communication line from the one of the at least two devices to the positive receive communication line to the another of the at least two devices when the system is in the normal operation mode and to switchingly couple the positive transmit communication line form the one of the at least two devices to the negative receive communication line to the another of the at least two devices when the system is in the glitch mode,
   a second one of the four switch devices is used to switchingly couple the negative transmit communication line from the one of the at least two devices to the negative receive communication line to the another of the at least two devices when the system is in the normal operation mode and to switchingly couple the negative transmit communication line from the one of the at least two devices to the positive receive communication line to the another of the at least two devices when the system is in the glitch mode,
   a third one of the four switch devices is used to switchingly couple the positive transmit communication line from the another of the at least two devices to the positive receive communication line to the one of the at least two devices when the system is in the normal operation mode and to witchingly couple the positive transmit communication line from the another of the at least two devices to the negative receive communication line to the one of the at least two devices when the system is in the glitch mode, and
   a fourth one of the four switch devices is used to switchingly couple the negative transmit communication line from the another of the at least two devices to the negative receive communication line to the one of the at least two devices when the system is in the normal operation mode and to witchingly couple the negative transmit communication line from the another of the at least two devices to the positive receive communication line to the one of the at least two devices when the system is in the glitch mode.

17. The glitcher switch system according to claim 10, wherein the control circuit further comprises:
   a timer for controlling a time between when the polarity inversions of the communication lines occur and
   a one shot monostable multivibrator for controlling a length of time that the communication lines have their polarity inverted.

18. The glitcher switch system according to claim 11 wherein the at least two devices are electrical devices and the switch is coupled to the electrical devices.

19. The glitcher switch system according to claim 11 wherein the at least two devices are fibre channel communication devices and wherein the system further comprises:
   electrical-to-optical converters coupled between the switch and the fibre channel communication devices wherein the electrical-to-optical converters convert electrical signals from the switch to fibre channel communication signals that are sent to the fibre channel communication devices.

20. The glitcher switch system according to claim 19 wherein the electrical-to-optical converters are gigabit interface converters.

21. The glitcher switch system according to claim 19 wherein the electrical-to-optical converters are media interface adapters.

22. A method of providing normal operations and error recovery checking procedures for a system having at least two devices linked together by communication lines:
   maintaining the communication lines between the at least two devices in proper polarity when the system is performing in the normal operations, and
   phase inverting die polarity of the communication lines in providing disparity errors between the at least two devices when the system is performing error recovery checking procedures.

* * * * *